(12) United States Patent
Wu et al.

(10) Patent No.: US 12,523,585 B2
(45) Date of Patent: Jan. 13, 2026

(54) DEVICE FOR ACCURATELY MEASURING BENDING STRAIN OF SUPERCONDUCTING STRAND

(71) Applicant: Hefei Institutes of Physical Science, CAS, Hefei (CN)

(72) Inventors: Yu Wu, Hefei (CN); Yunhao Liu, Hefei (CN); Peng Gao, Hefei (CN); Chao Dai, Hefei (CN); Zichuan Guo, Hefei (CN)

(73) Assignee: Hefei Institutes of Physical Science, CAS, Hefei (CN)

( * ) Notice: Subject to any disclaimer, the term of this patent is extended or adjusted under 35 U.S.C. 154(b) by 329 days.

(21) Appl. No.: 18/456,310

(22) Filed: Aug. 25, 2023

(65) Prior Publication Data

US 2024/0085291 A1    Mar. 14, 2024

(30) Foreign Application Priority Data

Sep. 14, 2022 (CN) .......................... 202211115465.2

(51) Int. Cl.
  *G01N 3/20* (2006.01)
  *G01B 5/30* (2006.01)
  *G01B 7/16* (2006.01)

(52) U.S. Cl.
  CPC ................ *G01N 3/20* (2013.01); *G01B 5/30* (2013.01); *G01B 7/16* (2013.01)

(58) Field of Classification Search
  None
  See application file for complete search history.

(56) References Cited

U.S. PATENT DOCUMENTS

| | | | |
|---|---|---|---|
| 10,012,576 B2 * | 7/2018 | Zhao | G01N 3/26 |
| 10,996,150 B2 * | 5/2021 | Jeong | G01N 3/02 |
| 12,203,903 B2 * | 1/2025 | Joyce | G01N 3/20 |

FOREIGN PATENT DOCUMENTS

CN          106525573 A  *  3/2017  ............... G01N 3/04

* cited by examiner

*Primary Examiner* — Peter J Macchiarolo
*Assistant Examiner* — Jermaine L Jenkins

(57) ABSTRACT

A device for accurately measuring bending strain of a superconducting strand is provided. The bending strain precision measuring device includes a support frame. A driving mechanism is installed on the upper part of the support frame. An output end of the driving mechanism is sequentially connected with a weighing sensor and a pressure transmission module from top to bottom along the vertical direction. A bending strain module is installed on the lower part of the support frame. In a case that the output end of a driving mechanism moves downwards, the pressure transmission mechanism is capable of applying pressure to the superconducting strand placed on the bending strain module.

20 Claims, 3 Drawing Sheets

DEVICE FOR ACCURATELY MEASURING BENDING STRAIN OF SUPERCONDUCTING STRAND

CROSS-REFERENCE TO RELATED APPLICATION

This patent application claims the benefit and priority of Chinese Patent Application No. 202211115465.2 filed with the China National Intellectual Property Administration on Sep. 14, 2022, the disclosure of which is incorporated by reference herein in its entirety as part of the present application.

TECHNICAL FIELD

The present disclosure belongs to the performance testing field of superconducting strands, in particular to a device for accurately measuring bending strain of a superconducting strand.

BACKGROUND

Fusion energy, as an efficient and clean energy, has always been one of ideal energy sources for human beings. The fully superconducting Tokamak magnetically confined nuclear fusion reactor device is a reliable device which can realize fusion power generation, and the superconducting magnet is one of key components in the Tokamak device. The core component of the superconducting magnet is the superconducting cable, and the superconducting cable is made of a certain number of copper wires and superconducting strands twisted at different twisting pitches, so research on the superconducting strands is one of important tasks in the development of superconducting cables.

Different practical superconducting materials have different processing and preparation processes and different application scenarios. At present, low-temperature superconducting materials such as NbTi and $Nb_3Sn$ are widely used in fusion devices. $MgB_2$ is also used in power transmission cables of accelerators because of high critical temperature. High magnetic field applications of high-temperature superconductors, mainly including bismuth (Bi-2212) and yttrium (YBCO/ReBCO), are also paid much attention in big science devices, power equipment and other fields.

In the process of twisting the superconducting strands into superconducting cables and running in electromagnetic conditions, the superconducting strands are inevitably bent to a certain extent due to mechanical and electromagnetic stresses. While excessive bending may lead to a significant decline in the current carrying capacity (critical current) of the superconducting strands, especially for high-brittleness superconducting materials such as $Nb_3Sn$ and Bi-2212. Therefore, the bending strain of the superconducting strands is accurately applied and measured, so that the critical bending strain point when performance degradation occurs is determined, a more accurate relationship between critical current and bending strain is obtained, and the design, manufacturing and practical applications of the superconducting magnets are also facilitated.

At present, various cryogenic laboratories in the world have developed devices for measuring bending strain of a superconducting strand with different structures, but these devices still have some problems, such as large machining errors and assembly coordination errors of various parts of the device and low measurement accuracy in the process of bending strain measurement.

SUMMARY

Aiming at the shortages in the prior art, the present disclosure aims to provide a device for accurately measuring bending strain of a superconducting strand. The device is novel in structural design, simple in an overall bending strain transmission structure, so that transmission errors caused by complex mechanical mechanisms are reduced, and the bending strain application accuracy and measurement accuracy of the superconducting strand are greatly improved.

In order to achieve the purpose, the present disclosure adopts the following technical scheme.

A device for accurately measuring bending strain of a superconducting strand includes a support frame. Preferably, the support frame includes an upper supporting plate and a lower supporting plate arranged opposite to each other, and a supporting rod located between the upper supporting plate and the lower supporting plate and configured for fixedly connecting the upper supporting plate to the lower supporting plate. A driving mechanism is installed at the bottom of the upper supporting plate, and an output end of the driving mechanism is vertically downward and sequentially connected with a weighing sensor and a pressure transmission module from top to bottom along the vertical direction. A bending strain module is installed on the top of the lower supporting plate, and the bending strain module is located directly below the pressure transmission module. Further, the driving mechanism is a Z-axis automatic sliding table installed at the bottom of the upper supporting plate. When an output end of the Z-axis automatic sliding table moves downward, the pressure transmission module can be synchronously driven to move downward, and the pressure transmission module applies downward pressure on the superconducting strand, so that the bending strain of the superconducting strand can be detected by the bending strain module. The driving mechanism composed of the Z-axis automatic sliding table in the present disclosure has the advantages that the precision of the integral assembly and the driving downward movement can be controlled at about 1 μm, the driving mechanism is high in controllability and high in measurement precision, which cannot be realized by the same type of free assembly at present. In order to facilitate assembly between the Z-axis automatic sliding table and the weighing sensor, the output end of the Z-axis automatic sliding table is connected with the weighing sensor through a connecting plate. The bending strain module includes a supporting block, a bending strain detection module and a limiting block.

A top surface of the supporting block is fixedly provided with multiple positioning teeth for supporting the superconducting strand. Further, the outer side of the supporting block is covered with two centrally symmetrical supporting shells, a cavity for accommodating the supporting block is formed inside the supporting shells, a window is formed in the side wall of each of the supporting shells, and the window is used for preventing the supporting shells from blocking the limiting groove in the side wall of the supporting block so as to facilitate the assembly of the bending strain rod. The top of each of the supporting shells is a supporting platform, an L-shaped notch is formed in a side wall of the supporting platform, and the L-shaped notches of the two supporting shells are jointed to form a space for the positioning teeth to extend out. An arc-shaped groove for placing the superconducting strand is formed in the top of the supporting platform. The arc-shaped groove plays a role in fixing the position of the superconducting strand. Before testing, the position stability of the superconducting strand can be ensured by welding the superconducting strand on the supporting platform.

The bending strain detection module includes a bending strain rod and strain gauges. The bending strain rod is preferably made of Ti-6Al-4V alloy. The Ti-6Al-4V alloy has a thermal contraction coefficient similar to that of the superconducting strand. The strain measuring precision of the superconducting strand can be improved by selecting the bending strain rod made of Ti-6Al-4V alloy. In addition, the Ti-6Al-4V alloy has good yield strength and tensile strength, and is high in stability. The bending strain rod is of a half I-shaped structure, and includes a first horizontal part and a second horizontal part which are relatively symmetrical, and a vertical part for connecting the first horizontal part to the second horizontal part. Free end portions of the first horizontal part and the second horizontal part respectively extend outward along the vertical direction to form a first protrusion and a second protrusion. When the superconducting strand is placed on the positioning teeth, the bottom surface of the superconducting strand is just in contact with the first protrusion. In order to enable the superconducting strand to be stably placed on the top of the first protrusion, a positioning groove is formed at the position where the top of the first protrusion is in contact with the superconducting strand, and the size of the positioning groove is adapted to the superconducting strand. The strain gauges are symmetrically fixed on inner wall surfaces of the first horizontal portion and the second horizontal portion. At least one limiting groove for placing the bending strain rod is formed in a side surface of the supporting block. Preferably, the upper part of the limiting groove is a first limiting part adapted to the size of the first horizontal part, and the lower part of the limiting groove is a second limiting part adapted to the size of the second horizontal part. The first limiting part can play a good limiting role on the first horizontal part, and the second limiting part can play a good limiting role on the second horizontal part, so that when the bending strain rod is placed in the limiting groove, the position of the bending strain rod can be kept relatively stable without shaking, thereby ensuring the measuring precision. The upper part of the limiting groove penetrates through the top surface of the supporting block, and the first protrusion passes through a top of the limiting groove extends to a position above the supporting block and is at the same height as the positioning teeth, so that when the superconducting strand is placed on the positioning teeth, the superconducting strand can be simultaneously in contact with the first protrusion. Therefore, the stress state of the superconducting strand can be transmitted to the bending strain detection module through the first protrusion. The limiting block is installed on the side surface of the supporting block for fixing the bending strain rod.

The pressure transmission module includes a transmission rod and a pressure block fixed at the bottom of the transmission rod. The pressure block is in the shape of a pyramid with a small top and a large bottom. Bending teeth are installed on the bottom surface of the pressure block and configured for applying external force to the superconducting strand. The bending teeth and the positioning teeth are relatively staggered and located on the same straight line.

In a further scheme, the device for accurately measuring bending strain of a superconducting strand also includes a limiting rack. The limiting rack includes a lower connecting flange fixed at the bottom of the supporting block, an upper connecting flange located directly above the lower connecting flange and a connecting rod for connecting the lower connecting flange to the upper connecting flange. A central limiting hole is formed in the middle part of the upper connecting flange so as to enable the transmission rod to pass through, and the inner diameter of the central limiting hole is adapted to the outer diameter of the transmission rod. The supporting block is fixed on the top of the lower connecting flange through a fixed base plate, and the lower connecting flange is fixed to the top of the lower supporting plate. The limiting rack can play a certain role in positioning and guiding the transmission rod through the central limiting hole, so that the transmission rod can keep moving vertically downward.

The above-mentioned Z-axis automatic sliding table, weighing sensor and strain gauges are all commercially available products, and the specific working principles are not described herein. Those skilled in the art can select the products with corresponding functions to be used in the present disclosure according to the actual need.

Compared with the prior art, the present disclosure has the following beneficial effects.

In the device for accurately measuring bending strain of a superconducting strand provided by the present disclosure, the downward pressure is applied to the superconducting strand through driving force generated by the driving mechanism, and a pressure value is detected by the weighing sensor, so that the pressure value can be accurately controlled and real-time monitoring is realized. Compared with existing testing devices, in the embodiments of the present disclosure, the volume of the driving mechanism is reduced, mechanical assembly errors are reduced, and the application bending strain range is greatly expanded. Through the design of the bending strain rod in the bending strain detection module, the bending strain generated by the superconducting strand can be accurately transmitted to the strain gauges, the structure is simple, transmission errors caused by complex mechanical mechanisms are reduced, and the application accuracy and measurement accuracy of the bending strain of the superconducting strand are greatly improved. In the present disclosure, the bending strain module and the driving mechanism can both be designed as detachable connecting structures, so that it is convenient to replace modules with different bending pitches and it is also convenient to subsequently assemble current leads and to measure critical current of samples. The support frame in the present disclosure is simple in structure and high in overall rigid, so that the overall device has good stability.

Figure 1:
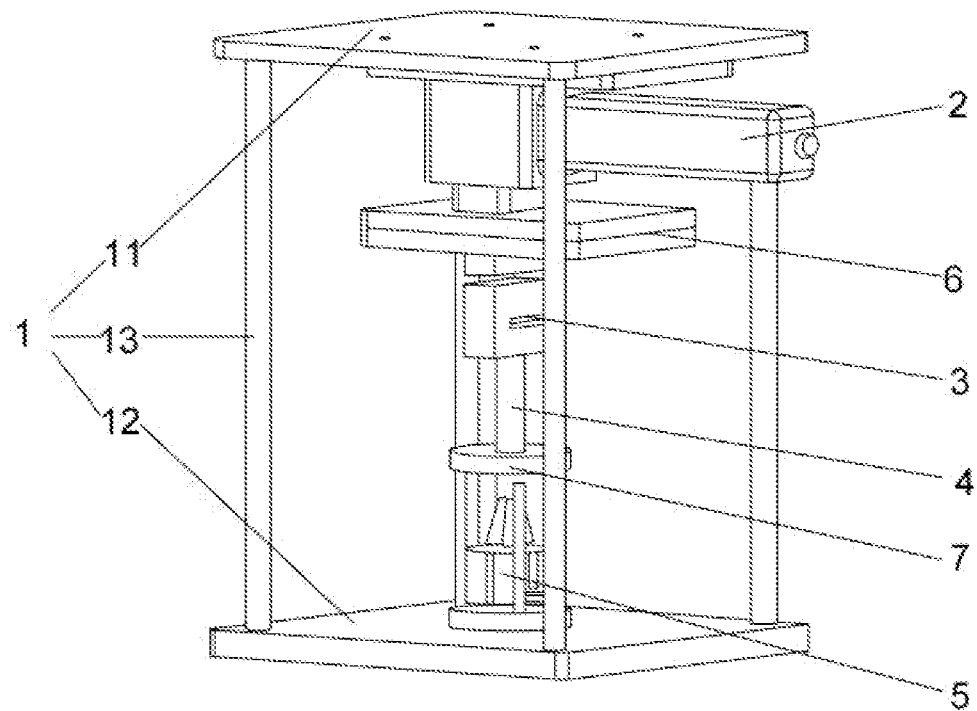
FIG. 1 is an integral structural schematic diagram of a device for accurately measuring bending strain of a superconducting strand provided by the present disclosure.

Reference signs: 1 support frame; 11 upper supporting plate; 12 lower supporting plate; 13 supporting rod; 2 driving mechanism; 3 weighing sensor; 4 pressure transmission module; 41 transmission rod; 42 pressure block; 43 bending tooth; 5 bending strain module; 51 supporting block; 52 bending strain detection module; 521 bending strain rod; 5211 first horizontal part; 5212 second horizontal part; 5213 vertical part; 5214 first protrusion; 5215 second protrusion; 5216 positioning groove; 522 strain gauge; 53 limiting block; 54 positioning tooth; 55 limiting groove; 551 first limiting part; 552 second limiting part; 6 connecting plate; 7 limiting rack; 71 lower connecting flange; 72 upper connecting flange; 73 connecting rod; 74 central limiting hole; 8 fixed base plate; 9 supporting shell; 91 window; 92 supporting platform; 93 arc-shaped groove; and 10 superconducting strand.

DETAILED DESCRIPTION OF THE EMBODIMENTS

The present disclosure is further described in conjunction with the attached figures and specific embodiments so that those skilled in the art can better understand and implement the present disclosure, but the embodiments are not intended to be limitation of the present disclosure.

In addition, unless otherwise specified, the preparation processes in the following embodiments are all conventional means in the prior art in the art, so the preparation processes are not described in detail. Parts in the following embodiments all refer to parts by weight.

It should be noted that the terms "installation", "connection" and "fixed connection" in the present disclosure all mean that two parts connected with each other are fixed together, usually by welding, screwing or gluing. For those skilled in the art, the specific meanings of the terms in the present disclosure can be understood according to specific conditions.

In the description of the present disclosure, it needs to be illustrated that the indicative direction or position relations of the terms such as "upper", "lower", "top", "bottom", "inner" and "outer" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. The terms "first" and "second" do not represent specific numbers or orders, but are only used to distinguish names.

Referring to FIGS. 1 to 6, a device for accurately measuring bending strain of a superconducting strand includes a support frame 1 for supporting the whole measuring device. Preferably, the support frame 1 includes an upper supporting plate 11 and a lower supporting plate 12 arranged opposite to each other, and a supporting rod 13 which is located between the upper supporting plate 11 and the lower supporting plate 12 and used for fixedly connecting the upper supporting plate 11 to the lower supporting plate 12. A driving mechanism 2 is installed at the bottom of the upper supporting plate 11, and an output end of the driving mechanism 2 is vertically downward and sequentially connected with a weighing sensor 3 and a pressure transmission module 4 from top to bottom along the vertical direction. A bending strain module 5 is installed on the top of the lower supporting plate 12, and the bending strain module 5 is located at the position of 2-3 mm directly below the pressure transmission module 4. Further, the driving mechanism 2 is a Z-axis automatic sliding table installed at the bottom of the upper supporting plate 11. When an output end of the Z-axis automatic sliding table moves downward, the pressure transmission module 4 can be synchronously driven to move downward, and the pressure transmission module 4 applies downward pressure on the superconducting strand 10, so that the bending strain of the superconducting strand 10 can be detected by the bending strain module 5. In order to facilitate assembly between the Z-axis automatic sliding table and the weighing sensor 3, the output end of the Z-axis automatic sliding table is connected with the weighing sensor 3 through a connecting plate 6. The bending strain module 5 includes a supporting block 51, a bending strain detection module 52 and a limiting block 53.

Figure 3:
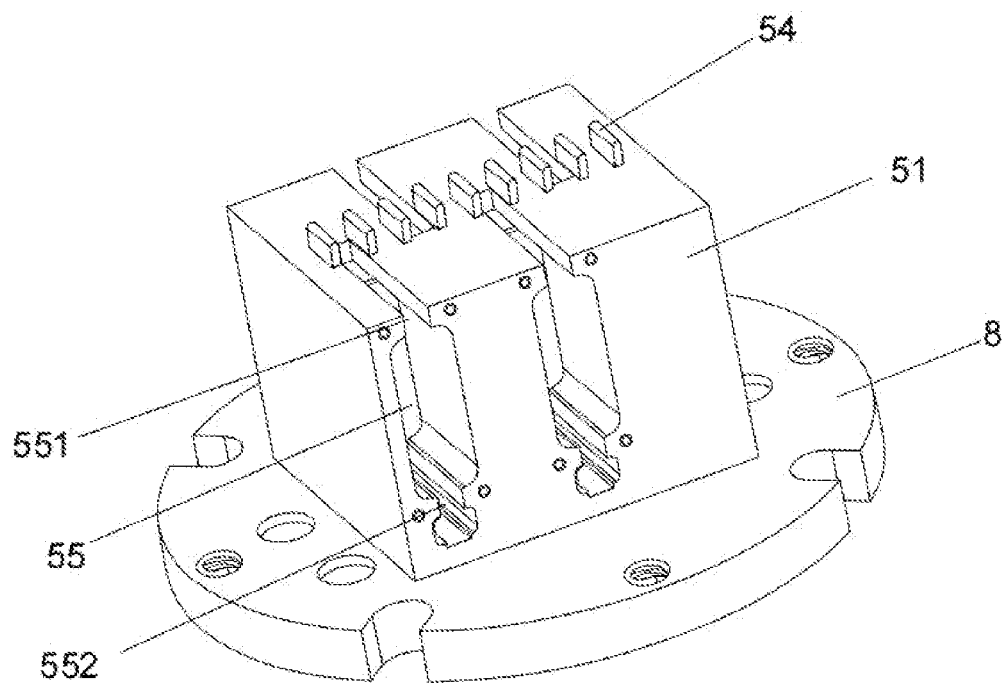
FIG. 3 is a structural schematic diagram of a supporting block.
Figure 4:
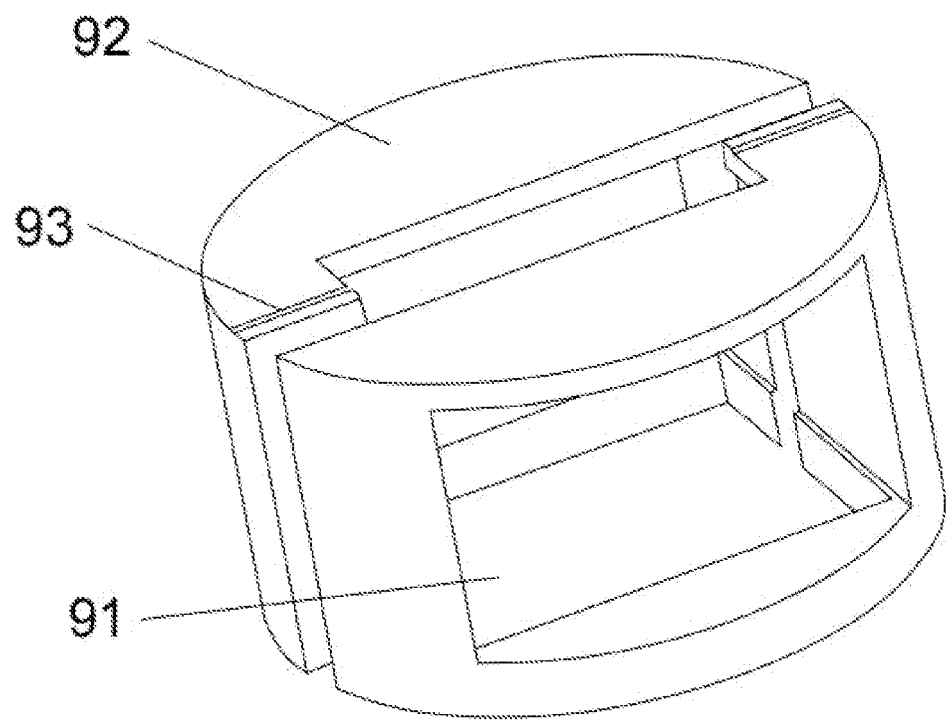
FIG. 4 is a structural schematic diagram of a supporting shell.

Referring to FIG. 3, a top surface of the supporting block 51 is fixedly provided with multiple positioning teeth 54 for supporting the superconducting strand 10. Further, the outer side of the supporting block 51 is covered with two centrally symmetrical supporting shells 9, referring to FIG. 4, a cavity for accommodating the supporting block 51 is formed inside the supporting shells 9, and a window 91 is formed in the side wall of each of the supporting shells 9. The top of the supporting shell 9 is a supporting platform 92, an L-shaped notch is formed in a side wall of the supporting platform 92, and the L-shaped notches of the two supporting shells 9 are jointed to form a space for the positioning teeth 54 to extend out. An arc-shaped groove 93 for placing the superconducting strand 10 is formed in the top of the supporting platform 92. The arc-shaped groove 93 plays a role in fixing the position of the superconducting strand 10. Before testing, the position stability of the superconducting strand 10 can be ensured by welding the superconducting strand 10 on the supporting platform 92.

Figure 5:
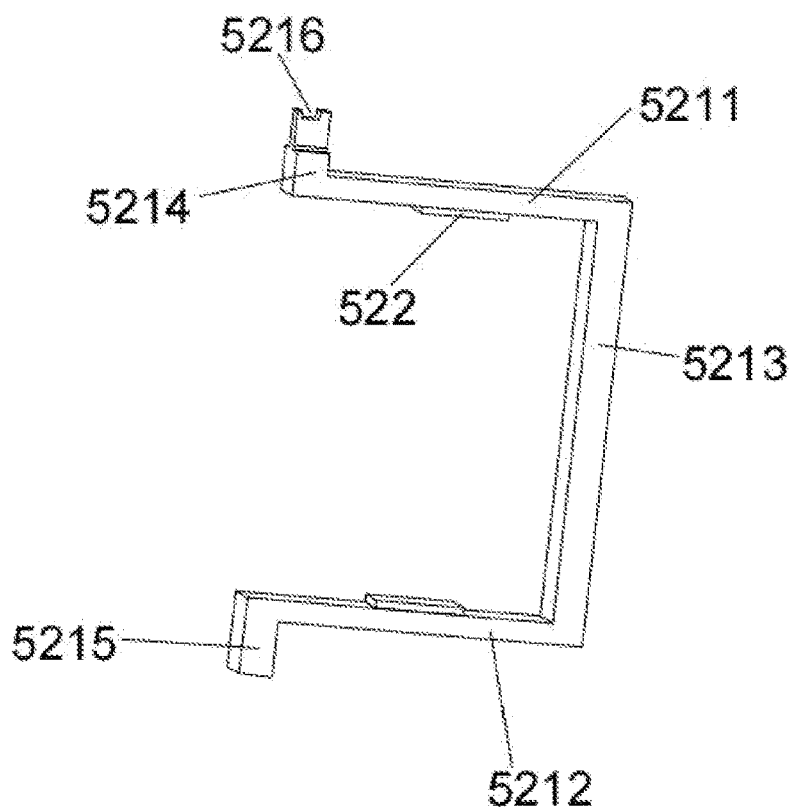
FIG. 5 is a structural schematic diagram of a bending strain detection module.
Figure 6:
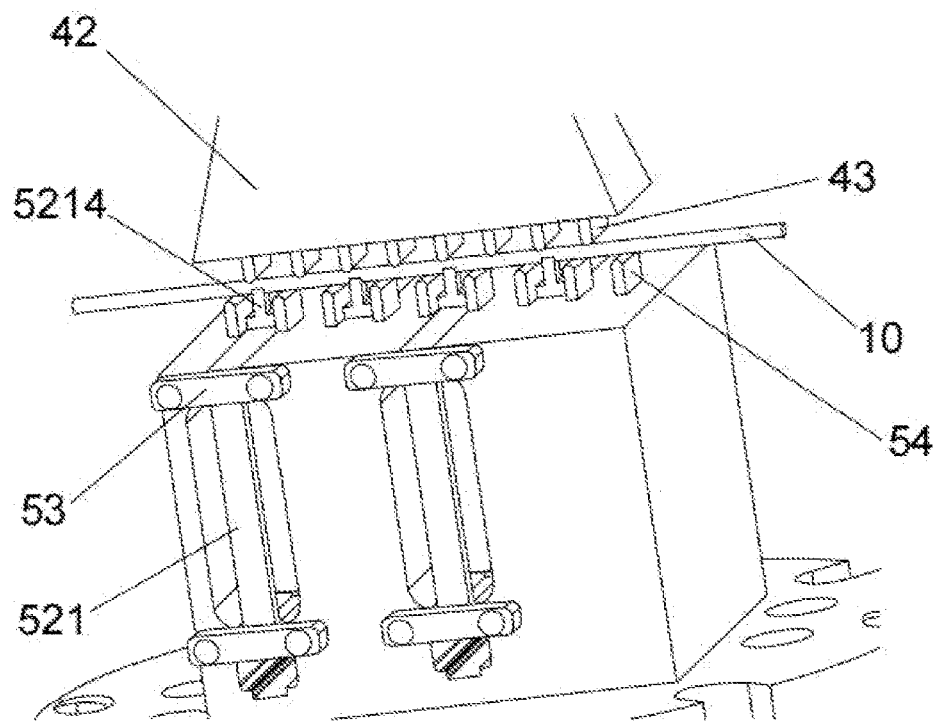
FIG. 6 is a partial structural schematic diagram of a superconducting strand placed on the top of the supporting block.

Referring to FIG. 5, the bending strain detection module 52 includes a bending strain rod 521 and strain gauges 522, and the bending strain rod 521 is preferably made of Ti-6Al-4V alloy. The bending strain rod 521 is of a half I-shaped structure, and includes a first horizontal part 5211 and a second horizontal part 5212 which are relatively symmetrical, and a vertical part 5213 for connecting the first horizontal part 5211 to the second horizontal part 5212. Free end portions of the first horizontal part 5211 and the second horizontal part 5212 respectively extend outward along the vertical direction to form a first protrusion 5214 and a second protrusion 5215. When the superconducting strand 10 is placed on the positioning teeth 54, the bottom surface of the superconducting strand 10 is just in contact with the first protrusion 5214. In order to enable the superconducting strand 10 to be stably placed on the top of the first protrusion 5214, a positioning groove 5216 is formed at the position where the top of the first protrusion 5214 is in contact with the superconducting strand 10, and the size of the positioning groove 5216 is adapted to the superconducting strand 10. The strain gauges 522 are symmetrically fixed on inner wall surfaces of the first horizontal portion 5211 and the second horizontal portion 5212. At least one limiting groove 55 for placing the bending strain rod 521 is formed in a side surface of the supporting block 51. Preferably, the upper part of the limiting groove 55 is a first limiting part 551 adapted to the size of the first horizontal part 5211, and the lower part of the limiting groove 55 is a second limiting part 552 adapted to the size of the second horizontal part 5212. As an embodiment, the number of the limiting grooves 55 is four, that is, two limiting grooves 55 are formed on each of the two sides of the supporting block 51, and the four limiting grooves 55 are staggered. Referring to FIG. 3, the upper part of the limiting groove 55 penetrates through the top surface of the supporting block 51, and the first protrusion 5214 passes through the top of the limiting groove 55, extends to a position above the supporting block 51 and is at the same height as the positioning teeth 54, so that when the superconducting strand 10 is placed on the positioning teeth 54, the superconducting strand 10 can be simultaneously in contact with the first protrusion 5214. Therefore, the stress state of the superconducting strand can be transmitted to the bending strain detection module 52 through the first protrusion 5214. The limiting block 53 is installed on the side surface of the supporting block 51 for fixing the bending strain rod 521.

Figure 2:
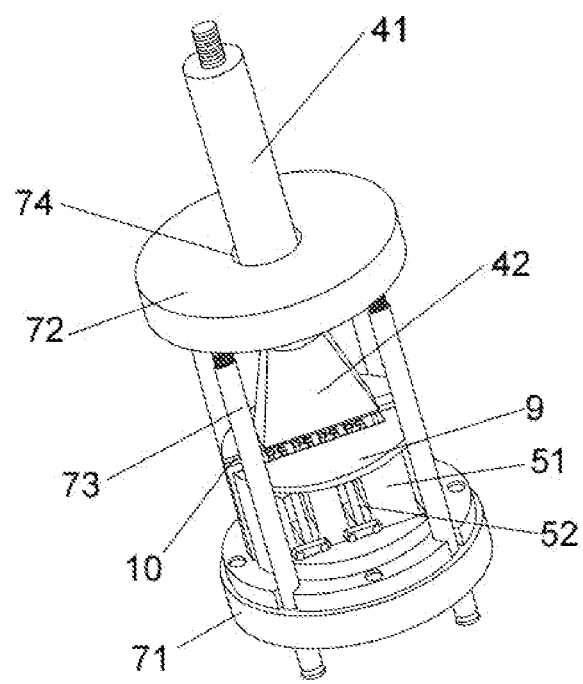
FIG. 2 is a structural schematic diagram showing a pressure transmission module and a bending strain module matched with each other.

Referring to FIG. 2, the pressure transmission module 4 includes a transmission rod 41 and a pressure block 42 fixed at the bottom of the transmission rod 41. The pressure block 42 is in the shape of a pyramid with a small top and a large bottom. Bending teeth 43 are installed on the bottom surface of the pressure block 42 and used for applying external force to the superconducting strand 10. The bending teeth 43 and the positioning teeth 54 are relatively staggered and located on the same straight line.

As a preferable embodiment, referring to FIGS. 1 and 2 again, the device for accurately measuring bending strain of a superconducting strand also includes a limiting rack 7. The limiting rack 7 includes a lower connecting flange 71 fixed at the bottom of the supporting block 51, an upper connecting flange 72 located directly above the lower connecting flange 71 and a connecting rod 73 for connecting the lower connecting flange 71 to the upper connecting flange 72. A central limiting hole 74 for the transmission rod 41 to pass through is formed in the middle part of the upper connecting flange 72, and the inner diameter of the central limiting hole 74 is adapted to the outer diameter of the transmission rod 41. The supporting block 51 is fixed on the top of the lower connecting flange 71 through a fixed base plate 8, and the lower connecting flange 71 is fixed to the top of the lower supporting plate 12. The limiting rack 7 can play a certain role in positioning and guiding the transmission rod 41 through the central limiting hole 74, so that the transmission rod 41 can keep moving vertically downward.

A using method of the device for accurately measuring bending strain of a superconducting strand provided by the present disclosure includes the following steps:

Before the measurement, firstly placing the superconducting strand 10 on the top of the positioning teeth 54, so that at this time, the first protrusions are in contact with the superconducting strand through the positioning grooves 5216, and then welding two ends of the superconducting strand to the supporting platform 92 to prevent the position of the superconducting strand from moving during the measurement, thus the installation of the superconducting strand is completed. In the measurement process, the driving mechanism 2 pushes the connecting plate 6 downward, and then synchronously drives the weighing sensor 3 and the pressure transmission module 4 to move downward. The transmission rod 41 of the pressure transmission module moves downward along the central limiting hole 74 of the upper connecting flange 72, and synchronously drives the pressure block 42 to move downward and apply downward pressure to the superconducting strand. The pressure applied on the superconducting strand is read out by the weighing sensor 3, and the bending strain is transmitted to the bending strain rod 521 and read out by the strain gauges 522 on the bending strain rod.

Apparently, the embodiments in the following description are a part rather than all of the embodiments of the present disclosure. On the basis of the embodiments of the present disclosure, all other embodiments obtained by those skilled in the art without making creative efforts shall fall within the scope of protection of the present disclosure.

What is claimed is:

1. A device for accurately measuring bending strain of a superconducting strand, comprising a support frame, wherein a driving mechanism is installed on an upper part of the support frame, and an output end of the driving mechanism is vertically downward and sequentially connected with a weighing sensor and a pressure transmission module from top to bottom along a vertical direction; a bending strain module is installed on a lower part of the support frame, and the bending strain module is located directly below the pressure transmission module; in a case that the output end of the driving mechanism moves downwards, the output end of the driving mechanism is capable of applying pressure to the superconducting strand placed on the bending strain module through the pressure transmission module;

wherein the bending strain module comprises a supporting block, a bending strain detection module and a limiting block; a top surface of the supporting block is fixedly provided with a plurality of positioning teeth for supporting the superconducting strand; the bending strain detection module comprises a bending strain rod and strain gauges, wherein the bending strain rod is of a half I-shaped structure, and comprises a first horizontal part and a second horizontal part which are relatively symmetrical, and a vertical part for connecting the first horizontal part to the second horizontal part; free end portions of the first horizontal part and the second horizontal part respectively extend outward along the vertical direction to form a first protrusion and a second protrusion; the strain gauges are symmetrically fixed on inner wall surfaces of the first horizontal part and the second horizontal part; and wherein at least one limiting groove for placing the bending strain rod is formed in a side surface of the supporting block, an upper part of the limiting groove penetrates through the top surface of the supporting block, the first protrusion passes through a top of the limiting groove, extends to a position above the supporting block and is at a same height as the positioning teeth;

and the limiting block is installed on the side surface of the supporting block and configured for fixing a position of the bending strain rod.

2. The device for accurately measuring bending strain of the superconducting strand according to claim 1, wherein the pressure transmission module comprises a transmission rod and a pressure block fixed at a bottom of the transmission rod, the pressure block is in a shape of a pyramid with a small top and a large bottom, bending teeth are installed on a bottom surface of the pressure block, and the bending teeth and the positioning teeth are relatively staggered and located on a same straight line.

3. The device for accurately measuring bending strain of the superconducting strand according to claim 2, further comprising a limiting rack, wherein the limiting rack comprises a lower connecting flange fixed at a bottom of the supporting block, an upper connecting flange located directly above the lower connecting flange and a connecting rod for connecting the lower connecting flange to the upper connecting flange; a central limiting hole is formed in a middle part of the upper connecting flange so as to enable the transmission rod to pass through, and an inner diameter of the central limiting hole is adapted to an outer diameter of the transmission rod; and the supporting block is fixed on a top of the lower connecting flange through a fixed base plate.

4. The device for accurately measuring bending strain of the superconducting strand according to claim 3, wherein the support frame comprises an upper supporting plate and a lower supporting plate arranged opposite to each other, and a supporting rod located between the upper supporting plate and the lower supporting plate and configured for fixedly connecting the upper supporting plate to the lower supporting plate; and the lower connecting flange is fixed on a top of the lower supporting plate.

5. The device for accurately measuring bending strain of the superconducting strand according to claim 3, wherein a positioning groove is formed at a position where a top of the first protrusion is in contact with the superconducting strand, and a size of the positioning groove is adapted to the superconducting strand.

6. The device for accurately measuring bending strain of the superconducting strand according to claim 5, wherein the bending strain rod is made of Ti-6Al-4V alloy.

7. The device for accurately measuring bending strain of the superconducting strand according to claim 5, wherein the driving mechanism is a Z-axis automatic sliding table installed on a bottom surface of the upper part of the support frame.

8. The device for accurately measuring bending strain of the superconducting strand according to claim 2, wherein a positioning groove is formed at a position where a top of the first protrusion is in contact with the superconducting strand, and a size of the positioning groove is adapted to the superconducting strand.

9. The device for accurately measuring bending strain of the superconducting strand according to claim 8, wherein the bending strain rod is made of Ti-6Al-4V alloy.

10. The device for accurately measuring bending strain of the superconducting strand according to claim 8, wherein the driving mechanism is a Z-axis automatic sliding table installed on a bottom surface of the upper part of the support frame.

11. The device for accurately measuring bending strain of the superconducting strand according to claim 1, wherein an outer side of the supporting block is covered with two centrally symmetrical supporting shells, a cavity for accommodating the supporting block is formed inside the supporting shells, and a window is formed in a side wall of each of the supporting shells; a top of each of the supporting shells is a supporting platform, an L-shaped notch is formed in a side wall of the supporting platform, and the L-shaped notch of one of the two supporting shells and the L-shaped notch of an other one of the two supporting shells are jointed to form a space for the positioning teeth to extend out; and an arc-shaped groove for placing the superconducting strand is formed in a top of the supporting platform.

12. The device for accurately measuring bending strain of the superconducting strand according to claim 11, wherein a positioning groove is formed at a position where a top of the first protrusion is in contact with the superconducting strand, and a size of the positioning groove is adapted to the superconducting strand.

13. The device for accurately measuring bending strain of the superconducting strand according to claim 12, wherein the bending strain rod is made of Ti-6Al-4V alloy.

14. The device for accurately measuring bending strain of the superconducting strand according to claim 1, wherein an upper part of the limiting groove is a first limiting part adapted to a size of the first horizontal part, and a lower part of the limiting groove is a second limiting part adapted to a size of the second horizontal part.

15. The device for accurately measuring bending strain of the superconducting strand according to claim 14, wherein a positioning groove is formed at a position where a top of the first protrusion is in contact with the superconducting strand, and a size of the positioning groove is adapted to the superconducting strand.

16. The device for accurately measuring bending strain of the superconducting strand according to claim 15, wherein the bending strain rod is made of Ti-6Al-4V alloy.

17. The device for accurately measuring bending strain of the superconducting strand according to claim 1, wherein a positioning groove is formed at a position where a top of the first protrusion is in contact with the superconducting strand, and a size of the positioning groove is adapted to the superconducting strand.

18. The device for accurately measuring bending strain of the superconducting strand according to claim 17, wherein the bending strain rod is made of Ti-6Al-4V alloy.

19. The device for accurately measuring bending strain of the superconducting strand according to claim 17, wherein the driving mechanism is a Z-axis automatic sliding table installed on a bottom surface of the upper part of the support frame.

20. The device for accurately measuring bending strain of the superconducting strand according to claim 19, wherein an output end of the Z-axis automatic sliding table is connected with the weighing sensor through a connecting plate.

* * * * *